Dec. 13, 1927.
E. A. GILLINDER
1,652,779
METHOD OF MANUFACTURING GLASS SHADES AND PRODUCT THEREOF
Filed Aug. 1, 1925
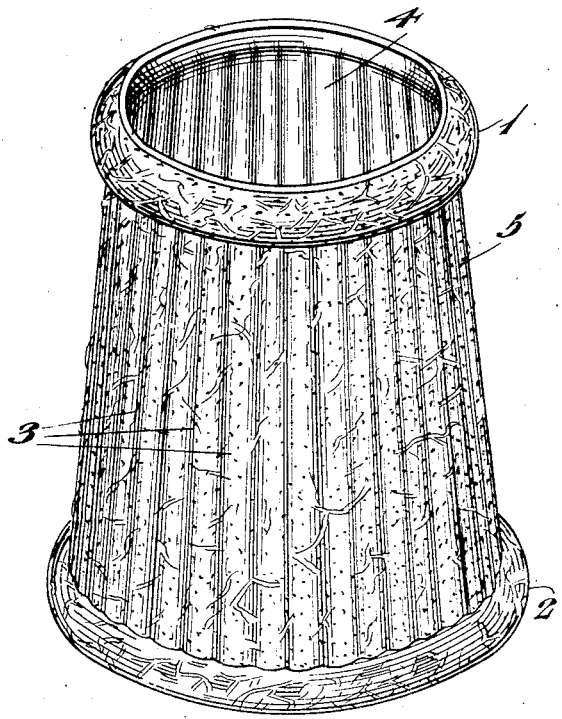
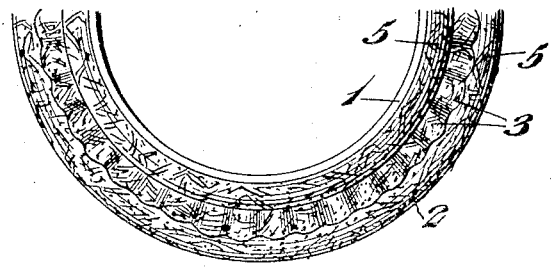
INVENTOR:
Edgar A. Gillinder,
BY
ATTORNEYS.

Patented Dec. 13, 1927.

1,652,779

UNITED STATES PATENT OFFICE.

EDGAR A. GILLINDER, OF PHILADELPHIA, PENNSYLVANIA.

METHOD OF MANUFACTURING GLASS SHADES AND PRODUCT THEREOF.

Application filed August 1, 1925. Serial No. 47,420.

This invention, generally stated, relates to a novel method of manufacturing a glass shade and the product derived therefrom, and has more especial relation to an illuminating shade of glassware having the general appearance and artistic effect of a silk shade. The leading object of the present invention resides in the novel method of manufacturing a glass shade of the character under consideration in which clear or colored glassware is first formed to the desired shape with either a smooth exterior or with longitudinally extending flutes, furrows, ridges or corrugations, and provided if desired with top and bottom annular beads, and which thereafter when cold is throughout its exterior properly coated with French fat oil of turpentine or with grounding oil, which oiled surface is then iced either by sprinkling or blowing ices or fine glass powder over said coating after which finally, the glassware is fired at a moderate degree of heat to produce the finished product.

It further consists in the novel product produced by the foregoing method.

Other and further objects not at this time more specifically pointed out will appear hereinafter.

To the above ends the invention consists in the novel method of manufacture of glassware of the character under consideration and in the novel product as derived therefrom.

The nature, characteristic features and scope of the invention will be more fully understood from the following description taken in connection with the accompanying drawings forming part hereof, and in which:—

Figure 1 represents a perspective view of a shade embodying the invention.

Figure 2 represents a partial top or plan view of Figure 1.

For the purpose of illustrating my invention I have shown in the accompanying drawings one form thereof which is at present preferred by me, since the same has been found in practice to give satisfactory and reliable results, although it is to be understood that the various instrumentalities of which my invention consists can be variously arranged and organized and that my invention is not limited to the precise arrangement and organization of these instrumentalities as herein shown and described.

According to the present invention, I first form as by molding or otherwise a suitable configuration of shade which for illustrative purposes has been shown in Figure 1 of the drawings as being of cone-frustrum shape, although obviously other forms of shades may be employed. Such glassware as formed is made of clear or colored glass, and is provided with top and bottom annular beads 1 and 2 and the major portion of the shade is longitudinally corrugated or fluted, or provided with ridges or furrows as at 3.

4 designates the inner surface of the shade which when colored glass is employed may have a smooth or glazed appearance, or if a clear crystal glass is employed, said inner shade surface may be sprayed with a suitable pigment to give the color desired.

The exterior surface of the shade, comprising the upper and lower beads and the longitudinal corrugated, fluted or furrowed surfaces between said beads, when cold, is coated with French fat oil of turpentine or grounding oil, following which I then sprinkle or blow the ices over said oil coating, and then fire the shade at a moderate degree of heat.

By the above described process, a finished product is produced whereby by the glass ices applied in the manner described, a very beautiful and ornamental roughened appearance is given to the exterior so that when light is reflected through the shade from the interior, the finished shade has the appearance of a silk shade of the desired color.

While I have shown the shade in the present instance as conforming generally to the shape of a truncated cone, it will be apparent that my invention in its broad aspects is applicable to all glass shades of different contours, made out of clear or colored glass.

In case a clear glass is employed, the desired color of the shade may be imparted thereto at any desired stage of the manufacture by spraying upon the inner surface 4, a pigment of the desired color. In case the shade is made of colored glass, the step of spraying the interior can obviously be omitted.

The body of the shade, prior to the application of the ices thereto, can be formed by any suitable molding or other process which it is unnecessary to describe in detail.

It will be evident that my invention is equally applicable to a shade having a smooth exterior surface, in lieu of the fluted, furrowed, or corrugated surface shown, and it is obvious that the configuration of the upper and lower beads 1 and 2 may be different from that shown, without departing from the spirit of my invention.

It will now be apparent that I have devised a novel and useful construction which embodies the features of advantage enumerated as desirable in the statement of the invention and the above description, and while I have in the present instance shown and described a preferred embodiment thereof which has been found in practice to give satisfactory and reliable results, it is to be understood that the same is susceptible of modification in various particulars without departing from the spirit or scope of the invention or sacrificing any of its advantages.

Having thus described my invention what I claim as new and desire to secure by Letters Patent, is:—

1. The method of forming a glass shade, which consists in first molding glass to produce a shade body of the form of a truncated cone, having upper and lower beads, next applying to the entire outer surface of said beads a coating of French fat oil of turpentine, next applying ices over every portion of said coating and shade, and lastly firing the iced shade at a moderate degree of heat.

2. As a new article of manufacture, a glass shade of truncated conical form having upper and lower annular beads, the entire outer portion of the shade body and beads having a granular surface formed by ices which have been fused to the entire surface of the shade.

3. As a new article of manufacture, a glass shade of truncated conical form having upper and lower annular beads, and longitudinally extending flutes, the entire outer portion of said shade and beads having granular surfaces formed by ices which have been fused thereto.

EDGAR A. GILLINDER.